United States Patent
Sansum et al.

(10) Patent No.: US 8,167,215 B2
(45) Date of Patent: May 1, 2012

(54) THERMOSTATIC MIXING VALVES UTILIZING WAVE SPRINGS

(75) Inventors: Nigel Paul Sansum, Quedgeley (GB); Richard Timothy Hopson, Cheltenham (GB)

(73) Assignee: Kohler Mira Limited, Gloucestershire (GB)

(*) Notice: Subject to any disclaimer, the term of this patent is extended or adjusted under 35 U.S.C. 154(b) by 744 days.

(21) Appl. No.: 11/304,324

(22) Filed: Dec. 15, 2005

(65) Prior Publication Data

US 2006/0124758 A1    Jun. 15, 2006

(30) Foreign Application Priority Data

Dec. 15, 2004 (GB) .................... 0427420.5

(51) Int. Cl.
G05D 23/185 (2006.01)
G05D 23/02 (2006.01)
(52) U.S. Cl. ................. 236/12.11; 236/101 R
(58) Field of Classification Search ........... 236/12.11, 236/101 R
See application file for complete search history.

(56) References Cited

U.S. PATENT DOCUMENTS

| | | | |
|---|---|---|---|
| 3,061,195 A | 10/1962 | Bowman | |
| 3,827,016 A | 7/1974 | Knapp | |
| 4,901,987 A * | 2/1990 | Greenhill et al. | 267/166 |
| 5,558,393 A * | 9/1996 | Hawkins et al. | 267/162 |
| 5,927,597 A | 7/1999 | Bolgár et al. | |
| 6,079,625 A * | 6/2000 | Lebkuchner | 236/12.2 |
| 6,325,295 B1 | 12/2001 | Lorch | |
| 6,454,175 B1 | 9/2002 | Lorch | |
| 6,471,132 B1 | 10/2002 | Knapp | |
| 6,517,006 B1 | 2/2003 | Knapp | |
| 6,575,377 B1 | 6/2003 | Graves | |
| 6,820,816 B1 | 11/2004 | Reid | |
| 2004/0089728 A1 | 5/2004 | Nember | |
| 2005/0116053 A1 * | 6/2005 | Goncze et al. | 236/12.11 |

FOREIGN PATENT DOCUMENTS

| | | |
|---|---|---|
| CH | 400 695 | 4/1966 |
| DE | 1 206 241 | 12/1965 |
| DE | 2 014 552 | 12/1971 |
| DE | 38 00 305 C1 | 3/1989 |
| DE | 297 05 145 U1 | 6/1997 |
| EP | 0 012 128 | 6/1980 |
| EP | 0 767 332 A2 | 4/1997 |
| FR | 2 569 815 | 3/1986 |
| GB | 1 039 162 | 8/1966 |
| GB | 1271587 | 4/1972 |
| GB | 1 352 917 | 5/1974 |
| GB | 2 213 566 A | 8/1989 |

(Continued)

*Primary Examiner* — Ljiljana Ciric
*Assistant Examiner* — Travis Ruby
(74) *Attorney, Agent, or Firm* — Greer, Burns & Crain, Ltd.

(57) ABSTRACT

A thermostatic mixing valve for hot and cold water has a valve member for controlling the relative proportions of hot and cold water admitted to a mixing chamber according to user selection of a desired water temperature and a thermostat responsive to the mixed water temperature to adjust the position of the valve member to maintain constant the selected water temperature. The valve member is biased by a return spring in the form of a wave spring having a plurality of turns with transverse waves configured such that adjacent turns sit peak to peak. The wave spring is strong in compression and weak in torsion allowing the ends of the spring to move laterally to accommodate any misalignment in the components of the valve.

17 Claims, 6 Drawing Sheets

FOREIGN PATENT DOCUMENTS

| GB | 2 329 691 A | 3/1999 |
| WO | WO 79/00313 | 6/1979 |
| WO | WO 94/15125 | 7/1994 |
| WO | WO 00/52545 | 9/2000 |
| WO | WO 01/02923 A1 | 1/2001 |
| WO | WO 02/03159 A1 | 1/2002 |

* cited by examiner

THERMOSTATIC MIXING VALVES UTILIZING WAVE SPRINGS

FIELD OF THE INVENTION

This invention concerns improvements in or relating to mixing valves. The invention has particular, but not exclusive, application to thermostatic mixing valves for water supply installations such as showers, baths and basins.

BACKGROUND OF THE INVENTION

Thermostatic mixing valves commonly employ a valve shuttle movable between hot and cold seats to control the relative proportions of hot and cold water supplied to an outlet in accordance with user selection of the outlet water temperature and a thermal control system to adjust the position of the valve shuttle to compensate for changes in the temperature and/or pressure of one or both supplies tending to change the set temperature. The known valve shuttles typically have a very small stroke, for example movement of the valve shuttle from full cold to full hot is generally less than 1 mm and is typically only 0.6 mm. As a result, misalignment of the valve shuttle affects the flows of hot and cold water and this can have a significant effect on the operation of the valve. For example, if the valve shuttle lifts off the hot seat unevenly, more of the hot water flows through one side of the valve and vice versa more of the cold water flows through the opposite side of the valve giving rise to asymmetric streams of hot and cold water producing incomplete mixing of the streams that affects the response of the thermal control system to correct any deviation in the outlet water temperature from the selected temperature. It has been proposed to employ close fit sliding guides to keep the valve shuttle aligned with the seats but the sliding parts add complexity, increase manufacturing costs and are susceptible to corrosion and lime-scale causing friction. Misalignment of the valve shuttle may also result in vibrations of the valve shuttle generating noise, especially under high pressure operating conditions. Thus, the water velocity at the edge of the valve shuttle produces a low pressure region that tends to pull the valve shuttle towards its seat and any misalignment of the valve shuttle causes the pull to be uneven and this can start vibration of the shuttle valve against its seat in what we believe is a nutating motion generating noise.

Typically, the valve shuttle is mounted on a thermostat and the thermostat is displaced against the biasing of a return spring. Traditionally, the return spring is a helical coil spring of wire of circular cross-section and this may contribute to misalignment of the valve shuttle. In particular, the final turn of wire at either end of the spring coils around, not as desired in a plane perpendicular to the helical axis, but at an angle to the perpendicular. As a result, the valve shuttle mounted on the thermostat can be forced out of line with the valve seats by the inclination of the final turn of the helical wire at the ends of the spring causing the thermostat, and thus the valve shuttle carried by the shuttle, to be tilted slightly relative to the axial direction. This problem persists even if the best quality helical wire springs are used.

Figure 6:
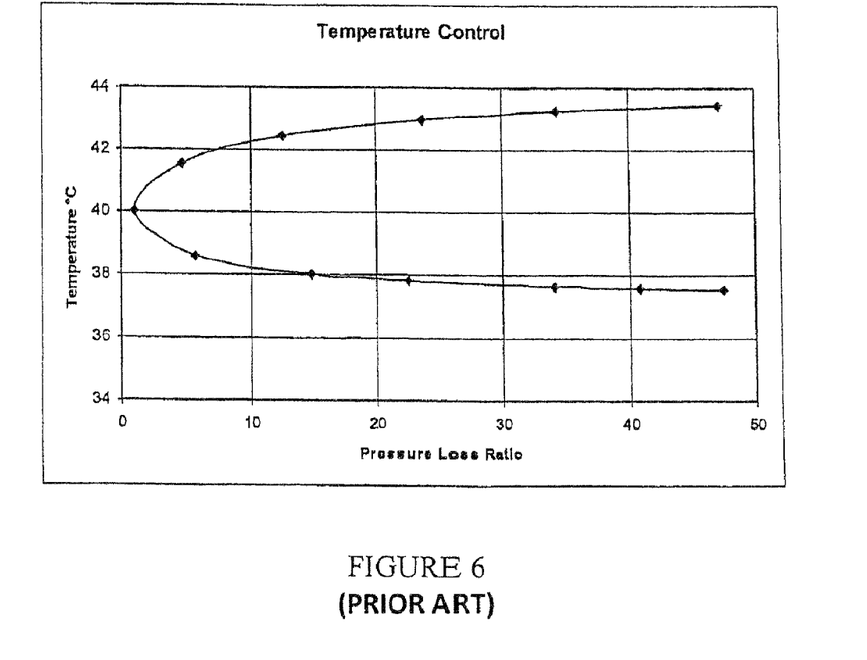
FIG. 6 is a graph of temperature versus pressure loss ratio for a typical thermostatic mixing valve.

Generally, thermostatic mixing valves can correct for inlet water temperature changes much better than inlet pressure changes. If the flow rate is reduced by restricting the valve outlet, then inlet pressure changes become much more severe for the valve to correct. FIG. 6 shows a graph of pressure loss ratio versus temperature of the mixed water at the outlet of a typical thermostatic mixing valve for a set temperature of 40° C. typically chosen for showering. Pressure loss ratio is the ratio of the higher inlet pressure drop to the lower inlet pressure drop across the mixing valve. Normally, higher hot water pressure results in increases in the temperature of the mixed water at the outlet and higher cold water pressure results in decreases in the temperature of mixed water at the outlet. The temperature deviations for pressure loss ratios tending to increase the set water temperature are higher than those tending to reduce the set water temperature because the set temperature is usually closer to the hot water inlet temperature than the cold water inlet temperature. As shown the overall spread of temperature variation is about 6° C.

This is unacceptable for many applications, for example in healthcare installations, and currently the performance requirements for these applications are met by skewing the response of the valve to reduce the size of hot deviations which may give rise to a risk of scalding with a consequential increase in the size of cold deviations which although noticeable to the user present less risk. The hot and cold water streams are often incompletely mixed as they flow past the thermostat and changes to the waterway geometry can alter the temperature at the thermostat. As a result, skewing the response is usually done on a trial and error basis until a response is achieved that meets the standard. This is inefficient and there is still a possibility that a valve could be used under conditions in which the cold water and hot water pressures are not equal resulting in hotter temperature deviations than intended. Moreover, it may not always be possible to meet the performance requirements by skewing the response of the valve.

SUMMARY

The present invention seeks to provide a mixing valve in which the aforementioned problems are overcome or are at least mitigated.

According to a first aspect of the present invention there is provided a thermostatic mixing valve having respective inlets for connection to supplies of hot and cold water and an outlet for temperature controlled water, a valve member movable between hot and cold seats to vary the relative proportions of hot and cold water supplied to a mixing chamber, thermostatic means responsive to temperature of water in the mixing chamber for controlling movement of the valve member in accordance with adjustable selection of the outlet water temperature, and a spring biasing the valve member wherein the spring comprises a wave spring.

By the use of a wave spring biasing the valve member, alignment of the valve member relative to the valve seats is improved. More specifically, free ends of the wave spring can be offset relative to each other and twisted out of square relative to the longitudinal axis of the spring allowing the spring to comply with mounting conditions in the mixing valve without forcing the valve member out of alignment with the seats. We have found that the performance of mixing valves employing the wave spring of the present invention is much more consistent than mixing valves having traditional helical wire springs.

Preferably, the wave spring is made of strip material, for example stainless steel strip, having a transverse cross-section wherein the width of the strip exceeds the depth of the strip. In particular, the strip may have a rectangular cross-section.

Preferably, a final turn at either end of the wave spring extends substantially in a plane perpendicular to a longitudinal axis of the spring. In this way, the turns at the ends of the spring provide a surface for mounting flush with surfaces perpendicular with the spring axis and further aids alignment of the valve member.

Preferably, each turn of the spring has transverse waves arranged such that the waves of adjacent turns sit peak to peak. The transverse waves may have a regular wavelength and for each turn of the spring (i.e. single rotation through 360°), there may be an odd number of half-wavelengths such that the transverse waves of adjacent turns sit peak to peak. Preferably, there are 5 half-wavelengths to each turn of the spring. The strip may be in the form of a sinusoidal wave in the direction of its length.

Preferably, the wave spring comprises a return spring biasing the valve member towards the cold seat. Alternatively or additionally, the wave spring comprises an overload spring biasing the valve member towards the thermostatic means.

According to a second aspect of the invention there is provided in a mixing valve, a wave spring made from strip material coiled about a longitudinal axis to form a plurality of successive spring turns extending between a first terminal end and a second terminal end, each spring turn having a wave form with wave crests and wave troughs in which adjacent spring turns are configured with wave crests of one spring turn abutting wave troughs of the other spring turn.

Preferably, the first and second terminal ends of the wave spring extend normal to the longitudinal axis.

Preferably, the strip material is of flat rectangular section having a width and a depth, wherein the width is greater than the depth.

Preferably, the wave spring is a return spring or an overload spring.

Preferably, the wave spring is provided in a thermostatic mixing valve.

According to a third aspect of the invention there is provided in or for a mixing valve for mixing two fluids, eg hot and cold water, means for controlling the mixing ratio of the two fluids, said means including a spring made of metal strip where at least one pair of adjacent turns of the spring is provided with opposed peaks that contact one another.

The control means may comprise a proportioning valve, preferably thermostatically controlled, and the spring may be a return spring and/or an overload spring.

According to a fourth aspect of the invention there is provided a mixing valve having respective inlets for hot and cold water and an outlet for temperature controlled water, valve means for varying the relative proportions of hot and cold water supplied to a mixing chamber, thermostatic means responsive to temperature of the water in the mixing chamber for adjusting the valve means to control movement of the valve means in accordance with user selection of the outlet water temperature, wherein flow of one of the cold water and hot water into the mixing chamber forms a series of jets arranged to intersect flow of the other of the cold water and hot water.

By arranging one of the hot water and cold water flows into a series of jets that intersect the other flow, the proportions of hot water and cold water mixing at the surface of the thermostatic means can be made to respond to the inlet water pressure so as to augment the temperature change normally experienced at the surface of the thermostatic means and generate an enhanced response from the thermostatic means.

Preferably, the series of jets is formed by the cold water flow to the mixing chamber. In a preferred arrangement, the hot water flow into the mixing chamber is in a direction substantially perpendicular to the jets of cold water. For example, the hot water may flow radially inwards towards the thermostatic means with the jets of cold water flowing axially to intersect the hot water. Alternatively, the series of jets may be formed by the hot water flow to the mixing chamber.

Preferably, the valve means is a shuttle valve comprising a cylindrical valve member having annular hot and cold seating faces at opposite ends for co-operating with hot and cold seats to control the ratio of hot and cold water admitted to the mixing chamber, and the series of jets is formed by a plurality of ports adjacent to the hot seating face. In this way, the cold water flowing through the ports intersects the hot water flowing radially inwards between the hot seat and the hot seating face of the valve member.

Preferably, the pattern of the ports can be altered to adjust the thermal control characteristics of the mixing valve. For example, the ports may be arranged in an annular array such that the thermal control characteristics of the mixing valve can be altered by changing any one or more of the pitch diameter of the array, the number of ports, the size and/or shape of the ports, and the orientation of the ports. In this way, it is envisaged that the mixing valve can be "tuned" to different performance requirements by choosing a particular pattern of the ports.

Preferably, means is provided for diverting a portion of the water away from the thermostatic means. The flow may be diverted to by-pass the chamber containing the thermostat and recombine with the non-diverted flow downstream of the thermostat. For example, the diverted flow may be delivered to the outlet for mixing with the water from the chamber containing the thermostat. Alternatively, the flow may be diverted away from the thermostat within the chamber containing the thermostat. For example, the diverted flow may be confined to an outer region of the chamber containing the mixing chamber.

In one arrangement, the diverter means is arranged such that a proportion of the hotter water is diverted away from the thermostat. By diverting a portion of the hotter water away from the thermostatic means, temperature deviations of the mixed water above the desired water temperature caused by changes in inlet water pressures are reduced. Also, where the diverted flow by-passes the chamber containing the thermostat, the total flow rate through the valve may be increased.

As will be appreciated, with the above arrangement, when the cold pressure increases (or the hot decreases), the thermostat sees a larger fall in temperature than it would normally see and this generates an enhanced response. Similarly, when the cold pressure decreases (or the hot increases), the thermostat sees a larger increase in temperature than it would normally see and this generates an enhanced response. Also, by diverting part of the hot flow away from the thermostat, the thermostat resides in water at a lower temperature than the actual outlet temperature when the main and diverted flows recombine, and this also generates an enhanced response.

According to a fifth aspect of the invention there is provided a mixing valve having respective inlets for connection to supplies of hot and cold water, an outlet for temperature controlled water, a shuttle valve mounted for axial movement relative to a sealing surface between annular hot and cold seats for controlling the ratio of hot and cold water delivered to the outlet, and a seal acting between the sealing surface and the ends of the shuttle valve wherein the shuttle valve has seating faces at opposite ends for co-operating with the hot and cold seats, and the seating faces and seal have substantially the same diameter such that the hot and cold water pressures at the inlets do not exert any axial forces on the shuttle.

It will be understood that features of the first, second, third, fourth and fifth aspects of the invention can be used in combination. In particular, a mixing valve comprising both a wave spring of the first, second and third aspects of the invention and the ports of the fourth aspect of the invention has improved temperature control characteristics. More specifically, deviations in the temperature of the mixed water with changes in inlet water pressure can be reduced. Furthermore, while any of the features have particular application to thermostatic mixing valves, one or more of the features may have application to a non-thermostatic mixing valve.

These and other features, benefits and advantages of the invention in each of its aspects will be apparent from the following description of a thermostatic mixing valve given by way example only with reference to the accompanying drawings.

DETAILED DESCRIPTION OF THE EXEMPLARY EMBODIMENTS

With reference to FIGS. 1 to 4, there is shown a thermostatic cartridge unit 1 of a mixing valve for a water supply installation such as a shower, bath or basin. The cartridge unit 1 is removably mounted in a body (not shown) of the mixing valve and has an annular groove 10 for an O-ring seal 10a (FIG. 2) to seal the cartridge unit 1 in the valve body.

Figure 1:
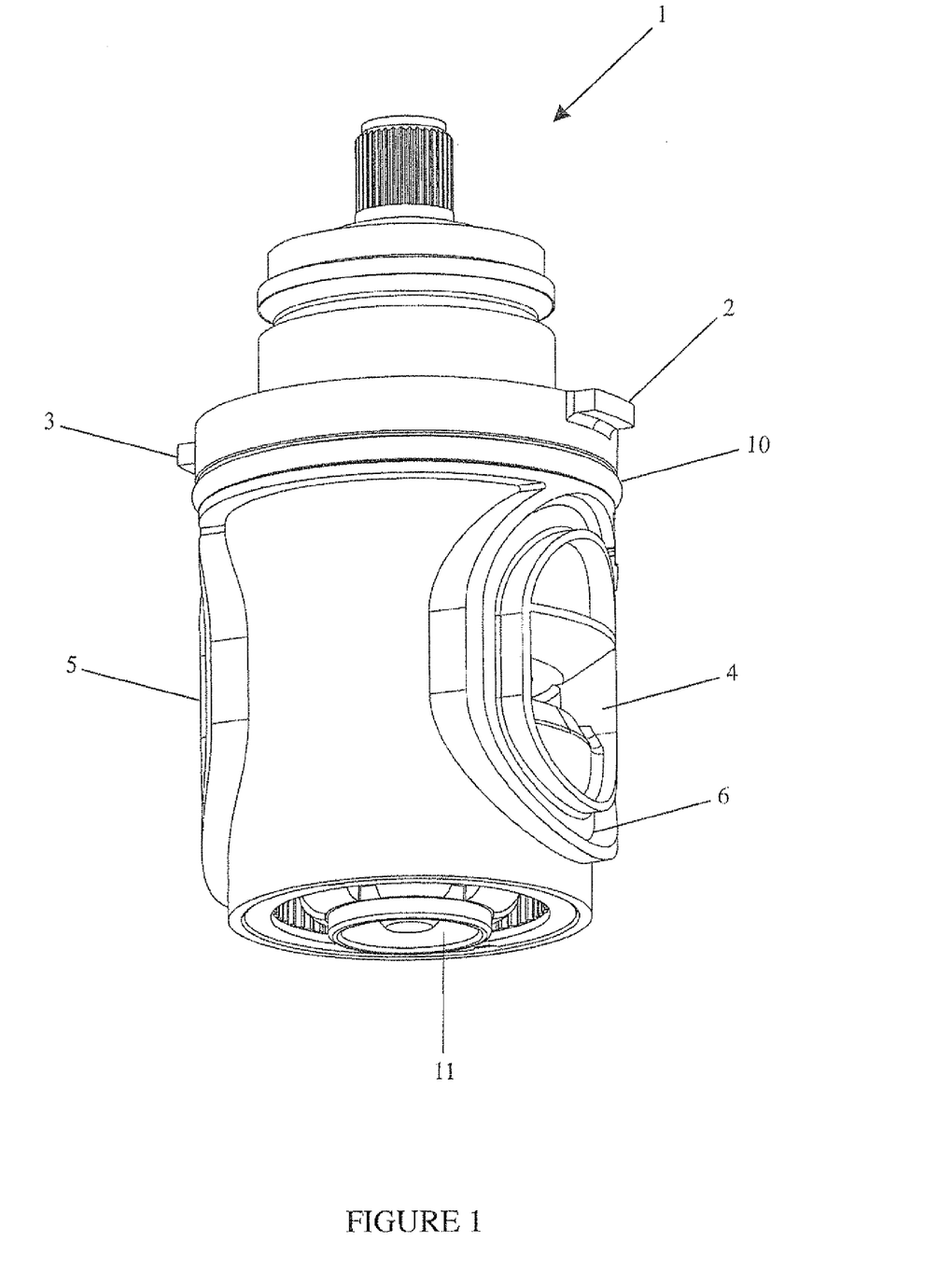
FIG. 1 is a perspective view of a cartridge unit according to an embodiment of the invention for a mixing valve.
Figure 2:
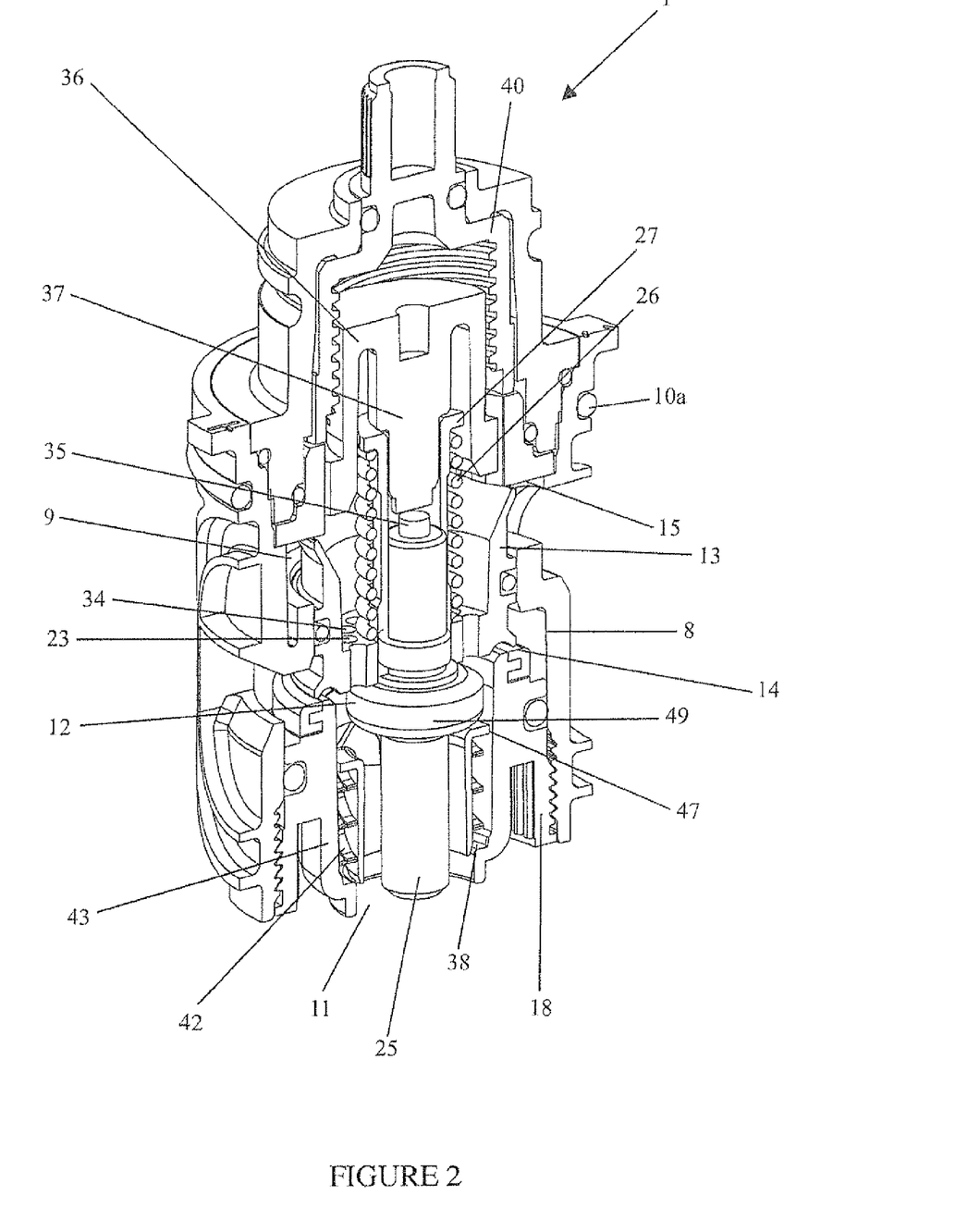
FIG. 2 is an isometric view of the cartridge unit shown in FIG. 1 having a section cut-away to reveal internal components of the cartridge unit.

The cartridge unit 1 has a pair of lugs 2,3 engageable with a pair of diametrically opposed notches in the valve body to prevent rotation of the cartridge unit 1 in the valve body and position the cartridge unit 1 to align inlets on the valve body for connection to supplies of hot and cold water respectively with a hot water inlet 4 and a cold water inlet 5 on the cartridge unit 1.

The inlets 4,5 are sealed relative to the opposed inlets in the valve body by O-rings (not shown) received in annular grooves 6,7 in the outer surface of cartridge unit 1 around the inlets 4,5. At a lower end of the cartridge unit 1 is an outlet 11 for delivering water mixed to the desired temperature in the cartridge unit 1 to an outlet in the valve body that can be connected to a delivery device of an ablutionary appliance, such as a hose and showerhead.

Figure 3:
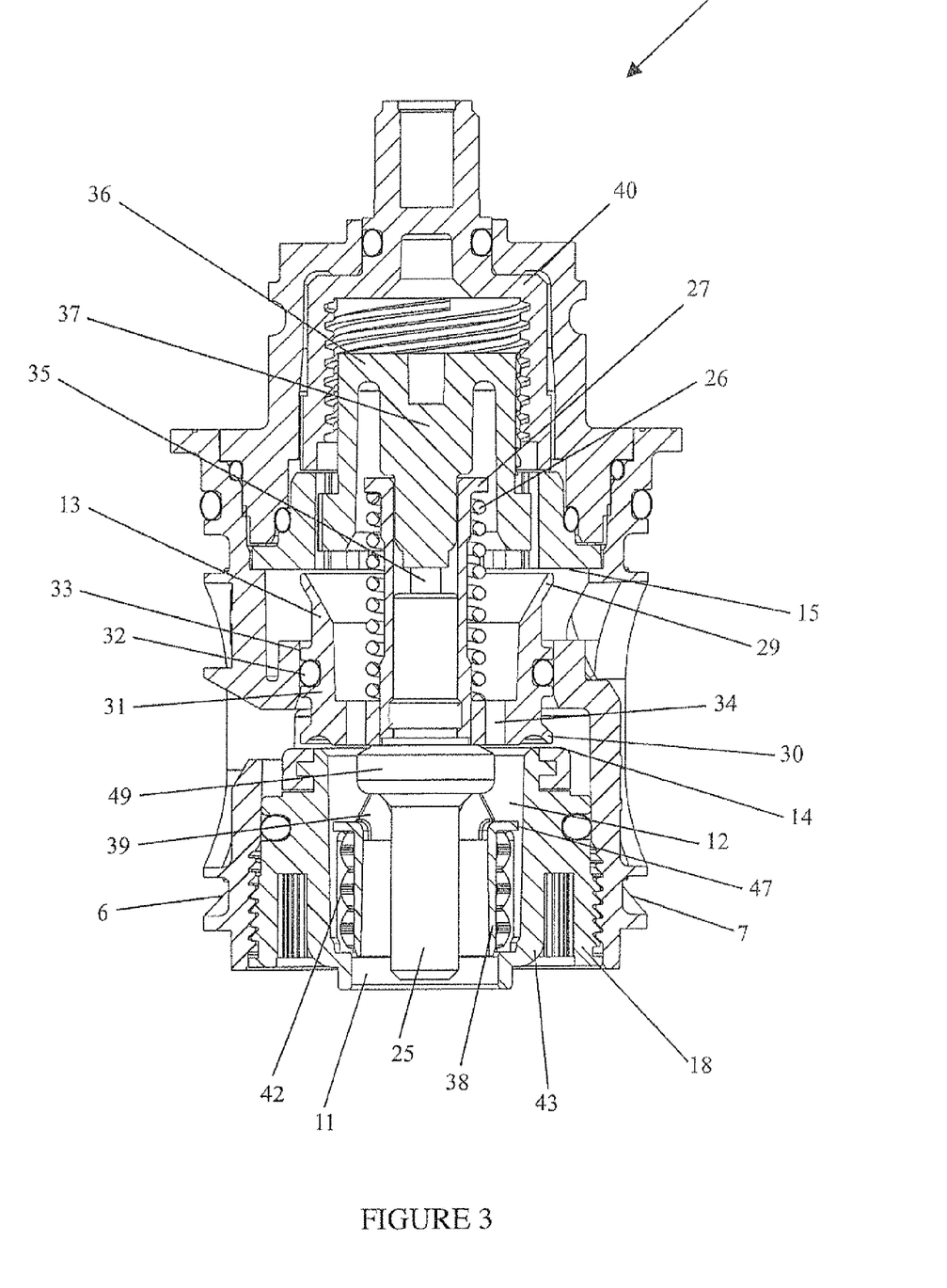
FIG. 3 is a longitudinal section through the cartridge unit shown in FIGS. 1 and 2.

The inlets 4,5 communicate with respective annular inlet chamber 8, 9 separated by a shuttle valve 13 arranged within the cartridge unit 1 for axial movement between a hot seat 14 and a cold seat 15 to control the relative proportions of hot and cold water admitted from the inlet chambers 8, 9 to an annular mixing chamber 12.

The cold seat 15 is made of hard plastics and is fixed in position. The hot seat 14 is part of a hot seat housing 18 that screws into the cartridge unit and is axially adjustable to vary the spacing between the seats 14,15 for setting the travel of the shuttle 13 for different operating/performance requirements. In this embodiment, the hot seat 14 is made of resilient thermoplastic elastomer but this is not essential and other suitable materials may be used, for example the hot seat 14 may be made of hard plastics. Similarly, the cold seat may be made of any suitable material.

Figure 3A:
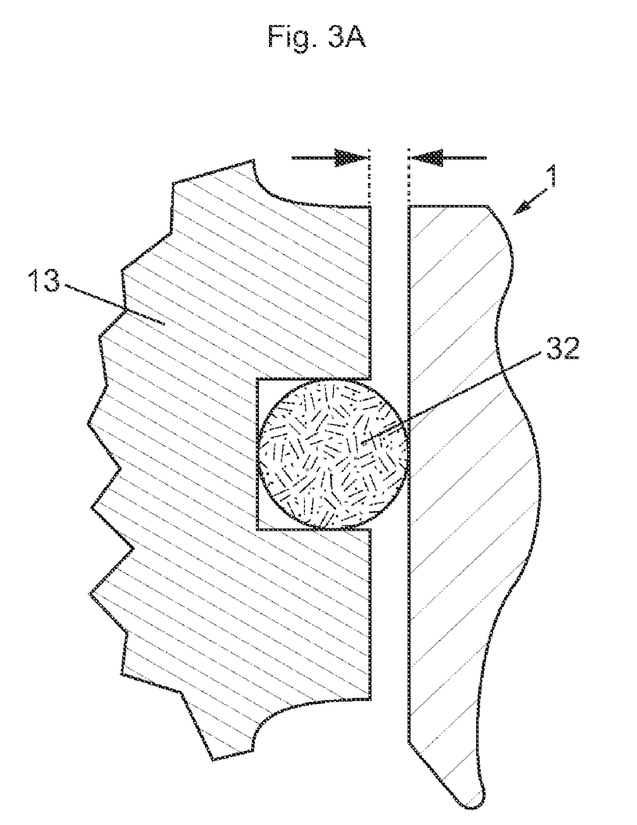
FIG. 3A is an enlarged schematic view of the valve member, the seal and the valve body of FIG. 3.

The shuttle valve 13 is a hollow tubular component with an annular seating face 29 at one end for engagement with the cold seat 15 and an annular seating face 30 at the other end for engagement with the hot seat 14. Between the ends, the shuttle 13 has a groove 31 that receives a separator seal 32 for slidably sealing against an inwardly facing surface 33 on the cartridge body. The seating faces 29,30 on the shuttle 13 and the separator seal 32 are of the same diameter such that cold and hot water inlet pressures do not exert any axial forces on the shuttle 13 that could result in misalignment or vibrations of the shuttle 13.

The shuttle 13 is slidably mounted on a wax-filled thermostat 25 by an internal web 23 adjacent to the seating face 30 and is biased against a boss 49 of the thermostat 25 by an overload spring 26 acting between the web 23 and a retainer sleeve 27 screwed on to the thermostat 25. In this way the shuttle 13 follows axial movement of the thermostat to adjust the position of the shuttle 13 between the hot and cold seats.

The thermostat 25 extends axially in the cartridge unit 1 and has an actuator rod 35 projecting from one end within the sleeve 27. The actuator rod 35 extends and retracts in response to change in volume of the wax filler caused by change in temperature of the water flowing over the thermostat 25.

The other end of the thermostat 25 extends axially within a flow guide 38 that directs water from the mixing chamber 12 to the outlet 11. The flow guide 38 has webs 39 that engage the boss 49 of the thermostat 25 and a return spring 42 acts between the hot seat housing 18 and the flow guide 38 to bias the thermostat 25 in opposition to user operable control means for selecting a desired water temperature.

The control means comprises a drive spindle 40 rotatable by a control knob (not shown) mounted on the outer end of the drive spindle 40, and a drive nut 36 screwed into the inner end of the control spindle 40. The drive nut 36 is located against rotation such that rotation of the control spindle 40 causes axial movement of the drive nut 36.

This axial movement is transmitted to the thermostat 25 by engagement of a drive rod 37 on the underside of the drive nut 36 with the actuator rod 35 for adjusting the position of the valve shuttle 13 carried by the thermostat 25 between the hot and cold seats 14,15 to vary the relative proportions of hot and cold water admitted to the mixing chamber 12 in accordance with user selection of the desired outlet water temperature.

In use, the wax filler expands to increase the projecting length of the actuator rod 35 if the temperature of the mixed water rises above the set temperature and contracts to reduce the projecting length of the actuator rod 35 if the temperature of the mixed water falls below the set temperature. As a result, the thermostat 25 is displaced and carries with it the shuttle 13 to alter the ratio of hot and cold water admitted to the mixing chamber 12 to correct the change in temperature from that selected.

In particular, the shuttle 13 is moved towards the hot seat 14 to reduce the flow of hot water and increase the flow of cold water to correct a rise in temperature, and towards the cold seat to reduce the flow of cold water and increase the flow of hot water to correct a fall in temperature.

If the temperature of the mixed water exceeds the maximum permitted, for example if the cold water supply fails, expansion of the wax filler causes the shuttle 13 to move until seating face 30 engages the hot seat 14 to shut-off flow of hot water. Further elongation of the actuator rod 35 is accommodated by compression of the overload spring 26 to prevent damage to the internal components of the cartridge unit 1.

Figure 4:
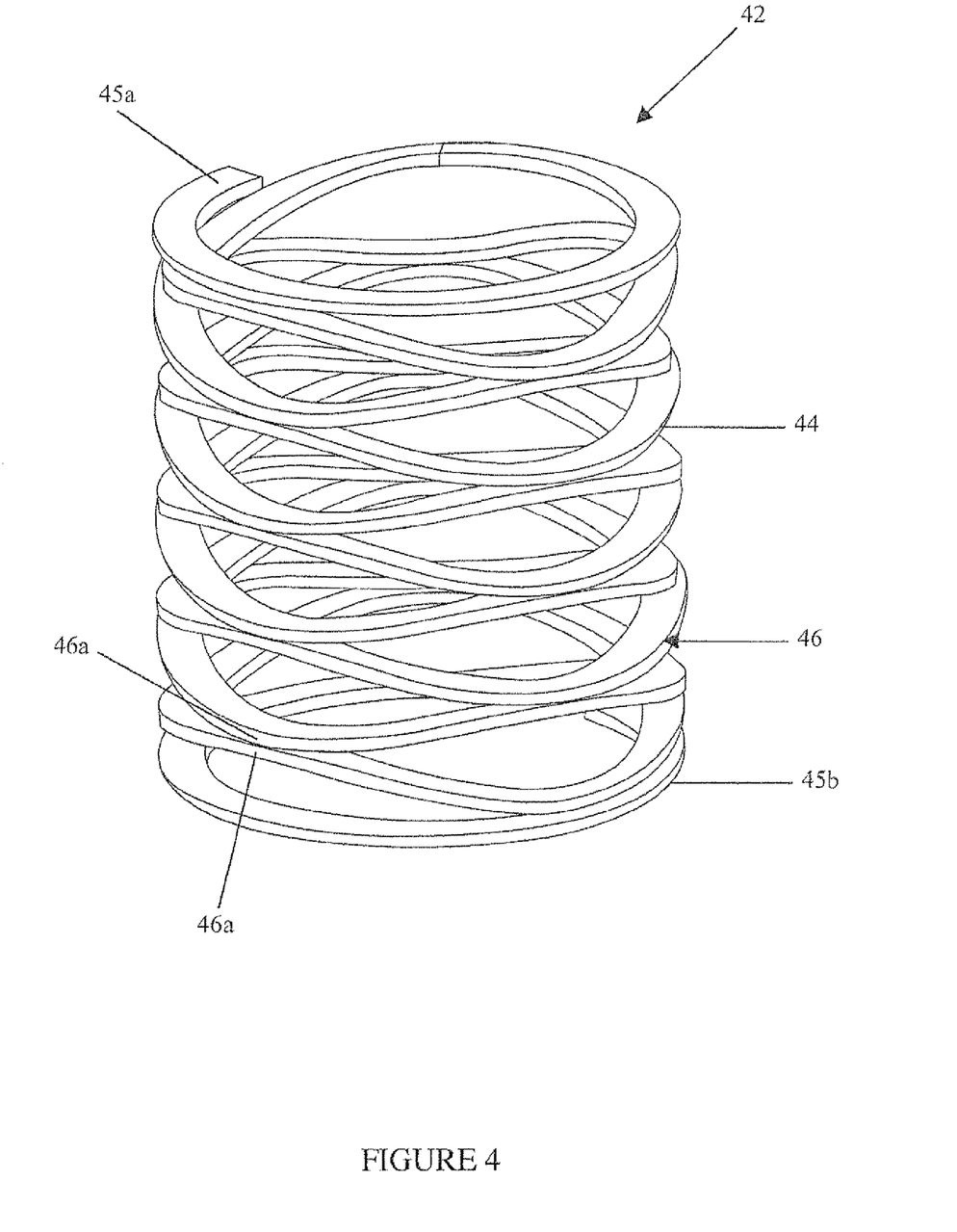
FIG. 4 is a perspective view of the return spring of the cartridge unit.

The above operation of the valve is improved according to the present invention by employing a wave spring as the return spring 42. As best shown in FIG. 4, the spring 42 is made of a strip 46 of spring material, such as stainless steel, having a rectangular cross-section.

The strip 46 has an undulating form with transverse waves 46a having the shape of a sinusoidal wave in the direction of the length of the strip 46. The strip 46 is generally formed into a helical shape with a plurality of turns 44 about a longitudinal axis. Each turn 44 of the spring 42 has a plurality of waves 46a with peaks formed by crests and troughs. In this embodiment each turn 44 is configured to contain 5 half-wavelengths and waves 46a of adjacent turns 44 sit peak to peak.

The strip 46 at each end 45a,b of the spring is not in the form of a sinusoidal wave but spirals around in a plane perpendicular to the axis of the helix to provide "flat" surfaces that seat on the guide 38 and hot seat housing 18.

The construction of the spring 42 from a thin metal strip of flat rectangular section in the form of sinusoidal waves where adjacent turns sit peak to peak makes the spring 42 strong in compression and weak in torsion.

As a result, the spring 42 can provide the axial stiffness of a conventional helical wire spring to meet the operating requirements but with a lower lateral stiffness such that, if one end of the spring is fixed, the other end can move laterally to allow the ends of the springs to comply readily with the mating parts of the guide 38 and hot seat housing 18 without forcing them out of position.

This behaviour is further enhanced compared to a conventional helical wire spring by the ability of the ends of the spring to be twisted out of square to the helix axis to provide "flat" surfaces for engagement with the mating parts of the guide 38 and hot seat housing 18.

As will be understood, reducing the resistance to lateral displacement of the ends of the spring 42 without compromising axial stiffness allows the ends of the spring 42 to be offset relative to each other while maintaining the seal faces on the shuttle 13 square with respect to the seats 14,15 to promote an even flow of water across the seats 14,15.

In this way, the asymmetric flow patterns that can occur if the shuttle is tilted are eliminated or significantly reduced with the result that the response of the mixing valve is more predictable and reliable producing a more consistent performance between similar valves.

It is envisaged that this will have benefits and advantages for development and production testing as well as making it easier to design valves to meet performance approvals for the different standards that exist eg between commercial, domestic and healthcare applications. In particular, it may no longer be necessary to test every valve and the occurrence of test failures requiring re-working and the associated costs may be reduced.

Another benefit resulting from the different lateral stiffness of the spring 42 compared to a typical helical wire spring is that the spring 42 has a different natural frequency of vibration that is believed to help prevent the shuttle 13 vibrating against the seats when it is close to the end of its travel. As a result, the generation of noise from such vibration may be eliminated or significantly reduced.

The operation of the valve is also improved according to the invention by providing the web 23 with a plurality of through holes 34 uniformly spaced apart in a circumferential direction around the thermostat 25. As a result, the cold water enters the mixing chamber 12 in a series of jets parallel to the axis of the shuttle 13.

The hot water enters the mixing chamber 12 as a thin film that jets inwards in a radial direction to intersect the axial jets of the cold water from the holes 34 in the web 23. This helps to promote mixing of the hot and cold water streams for sensing of the mixed water temperature by the thermostat 25 located in the mixing chamber 12.

Moreover, if either of the inlet water pressures changes, the arrangement of the jets of cold water that intersect the flow of hot water increases the change in temperature sensed by the thermostat 25 and so generates an enhanced reaction from the thermostat 25.

Thus, if the hot water is at a higher pressure than the cold water, it has more velocity energy than the cold water and tends to penetrate the jets of cold water causing the mean temperature of the water flowing over the thermostat to increase in temperature more than it would simply due to the hot water pressure increasing.

Conversely, if the cold water is at a higher pressure than the hot water, the jets of cold water penetrate the hot water film causing the mean temperature of the water flowing over the thermostat 25 to reduce in temperature more than it would do simply due to the cold water pressure increasing.

This enables the thermostat 25 to move the shuttle 13 to the new position with less change in temperature of the mixed water leaving the cartridge outlet 11. As a result, temperature deviations of the mixed water from the set temperature caused by changes in the inlet water pressures are reduced.

Figure 5:
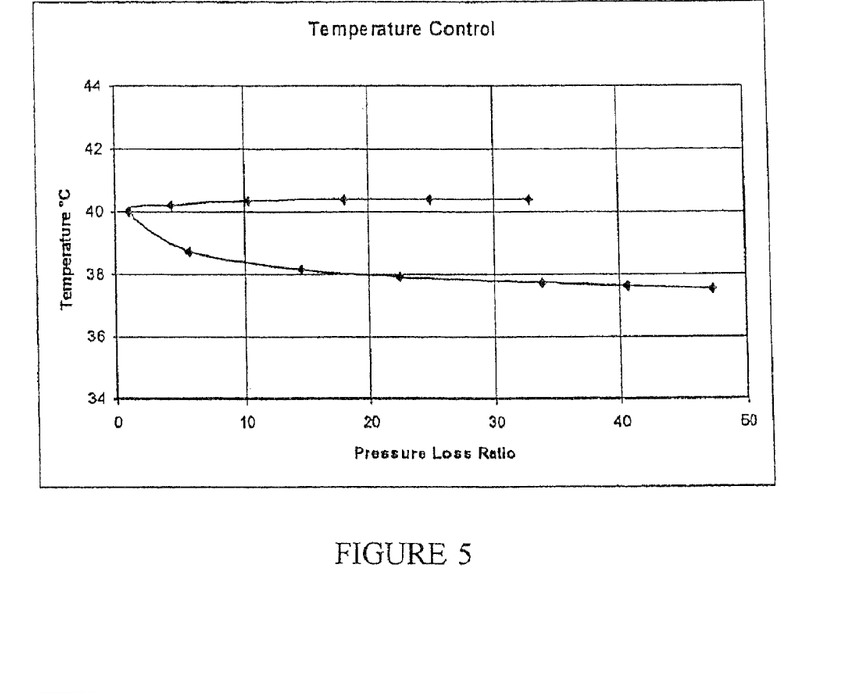
FIG. 5 is a graph of temperature versus pressure loss ratio for a thermostatic mixing valve according to the invention.

FIG. 5 shows the temperature -v-pressure loss characteristics of the valve for a set temperature of 40° C. typically chosen for showering and it can be seen that the total range of temperature deviation from for pressure changes tending to increase or reduce the water temperature is approximately 3° C. This is a considerable improvement over existing mixing valves as previously described with reference to FIG. 6.

In this embodiment, the holes 34 are of the same size and shape and form an annular array of jets that are uniformly spaced apart in the circumferential direction. It will be understood, however, that the dimensions and orientation of the holes 34 can be altered to tune the thermal control characteristics of the cartridge unit 1 to meet specific performance requirements. For example, by making the holes 34 smaller, the cold water velocity is increased and the total span of the temperature deviations is reduced. The effects are further enhanced if the number of holes is increased.

The response of the valve is further helped by providing a gap 47 between the flow guide 38 and the hot seat housing 18 that allows a proportion of the hotter water in the mixing chamber 12 to be diverted away from the thermostat 25 and flow out of the cartridge unit 1 via slots 43 in the hot seat housing 18 where it combine with the water from outlet 11.

The diverted flow of hotter water by-passes the part of the thermostat 25 extending within the flow guide 38 so that the thermostat resides in water that is slightly cooler than the actual temperature of the outlet water from the valve and this assists response of the thermostat 25 to change in temperature of the outlet water from that selected.

A further advantage of diverting part of the flow of hotter water to by-pass the thermostat 25 is that the total flow rate through the valve is increased.

In a modification (not shown), the diverted flow of hotter water is confined to the outer region of the chamber in which the thermostat is contained so that the thermostat again resides in water that is slightly cooler than the than the actual temperature of the outlet water from the valve.

It will be understood that the invention is not limited to the exemplary embodiments above-described. For example, the size and/or shape and/or spacing of the holes producing the jets of cold water may be altered to provide any desired performance characteristics.

It is envisaged that the shuttle can be made of plastics material by moulding employing moulding tools with interchangeable inserts enabling the pattern of holes in the web to be readily altered depending on the performance requirements of the mixing valve.

In this way, the holes can be tailored to compensate for variations in performance of a mixing valve caused by the design of the valve body, for example in bath/shower mixers having a large cast brass body that can cause variations in the performance of the mixing valve.

In the above-described embodiment, the return spring biasing the valve member towards the cold seat comprises a wave spring of flat metal strip and the overload spring biasing the valve member towards the thermostat comprises a helical spring made of round metal wire.

It will be understood, however, that the overload spring may also comprise a wave spring of flat metal strip similar to the return spring. Alternatively, the overload spring may be a wave spring of flat metal strip and the return spring a helical spring of round wire. The flat strip may be of rectangular cross-section or any other suitable cross-section, for example trapezoidal.

It will also be understood that the invention is not limited to thermostatic mixing valves and that any of the features described herein may be employed in a non-thermostatic valve where suitable.

Other variations and modifications that can be made within the spirit and scope of the invention will be apparent to those skilled in the art.

We claim:

1. A thermostatic mixing valve having a valve body and respective inlets for connection to supplies of hot and cold water and an outlet for temperature controlled water, a valve member movable between hot and cold seats to vary the relative proportions of hot and cold water supplied to a mixing chamber, said valve member being spaced from an inner surface of said valve body, a thermostat supporting said valve member and responsive to temperature of water in said mixing chamber for controlling movement of said valve member in accordance with adjustable selection of the outlet water temperature, a seal between said valve member and said inner surface of said valve body, a flow guide located within said mixing chamber and spaced from an inner surface of said valve body, a return spring mounted between said valve body and said flow guide which biases said flow guide against said thermostat for biasing said thermostat and said valve member towards said cold seat, said return spring comprising a wave spring having a longitudinal axis and opposing ends,
wherein the wave spring reduces resistance to lateral displacement of the ends for respectively maintaining seals between the hot and cold seats and promoting an even flow of water across the hot and cold seats when the ends of the wave spring are offset relative to the longitudinal axis.

2. The thermostatic mixing valve according to claim 1 wherein each turn of said wave spring has transverse waves arranged such that the waves of adjacent turns sit peak to peak.

3. The thermostatic mixing valve according to claim 2 wherein said transverse waves have a regular wavelength.

4. The thermostatic mixing valve according to claim 2 wherein each complete turn of said wave spring through 360degrees has an odd number of half-wavelengths.

5. The thermostatic mixing valve according to claim 4 wherein each turn of said wave spring has five half-wavelengths.

6. The thermostatic mixing valve according to claim 1 wherein said wave spring is made of strip material having a transverse cross-section with a width and a depth wherein said width of said strip exceeds said depth of said strip.

7. The thermostatic mixing valve according to claim 6 wherein said strip is in the form of a sinusoidal wave in the direction of its length.

8. The thermostatic mixing valve according to claim 6 wherein said strip is made of stainless steel.

9. The thermostatic mixing valve according to claim 6 wherein said strip has a rectangular cross-section.

10. The thermostatic mixing valve according to claim 1 wherein an overload spring is provided biasing said valve member towards said hot seat.

11. The thermostatic mixing valve according to claim 10 wherein said overload spring comprises a wave spring.

12. The thermostatic mixing valve according to claim 1, wherein said valve member is slidably mounted on said thermostat by an internal web, said web defining at least one through hole for delivering cold water into said mixing chamber.

13. The thermostatic mixing valve according to claim 12, wherein said web defines a plurality of through holes uniformly spaced about said thermostat.

14. The thermostatic mixing valve according to claim 1 wherein a final turn at either end of said wave spring extends substantially in a plane perpendicular to a longitudinal axis of said spring.

15. A thermostatic mixing valve having a valve body and respective inlets for connection to supplies of hot and cold water and an outlet for temperature controlled water, a valve member spaced from an inner surface of said valve body and movable between hot and cold seats to vary the relative proportions of hot and cold water supplied to a mixing chamber, a seal between said valve member and said inner surface of said valve body, a thermostat supporting said valve member and responsive to temperature of water in said mixing chamber for controlling movement of said valve member in accordance with adjustable selection of the outlet water temperature, an overload spring biasing said valve member towards said hot seat, a flow guide located within said mixing chamber and spaced from an inner surface of said valve body, a return spring mounted between said valve body and said flow guide which biases said flow guide against said thermostat for biasing said valve member towards said cold seat, wherein said return spring comprises a wave spring made from strip material coiled about a longitudinal axis to form a plurality of successive spring turns extending between a first terminal end engaging said valve body and a second terminal end engaging said flow guide, each spring turn having a wave form with wave crests and wave troughs in which adjacent spring turns are configured with wave crests of one spring turn abutting wave troughs of the other spring turn.

16. The thermostatic mixing valve of claim 15 wherein said wave spring is made from an elongate flat strip of having a width and a depth of which said width exceeds said depth and provides a contacting surface for said abutting crests and troughs of said spring turns.

17. A thermostatic mixing valve comprising:

a valve body and respective inlets for connection to supplies of hot and cold water and an outlet for temperature controlled water, a valve member spaced from an inner surface of said valve body and movable between hot and cold seats to vary the relative proportions of hot and cold water supplied to a mixing chamber, a seal between said valve member and said inner surface of said valve body, a thermostat supporting said valve member and responsive to temperature of water in said mixing chamber for controlling movement of said valve member in accordance with adjustable selection of the outlet water temperature, a flow guide located within said mixing chamber and spaced from an inner surface of said valve body, and a wave spring mounted between said valve body and said flow guide which biases said flow guide against said thermostat.

* * * * *